United States Patent [19]

Sirotinsky et al.

[11] 4,210,096
[45] Jul. 1, 1980

[54] APPARATUS FOR CONTINUOUS ENAMELLING OF TUBES

[76] Inventors: Alexandr A. Sirotinsky, Fergansky proezd, 13, korpus 1, kv. 15; Vladimir I. Prokofiev, ulitsa 14 Parkovaya, 3, kv. 33; Vitaly I. Timonin, Leningradskoe shosse, 7/3, korpus 2, kv. 42, all of Moscow; Nikolai V. Smolnikov, 2 Mikroraion, 73, kv. 15, Shevchenko Mangyshlaxkoi oblasti; Vladimir P. Karyaev, 6 Mikroraion, 3, kv. 42, Shevchenko Mangyshlaxkoi oblasti; Alexei P. Streltsov, 5 Mikroraion, 41, kv. 28, Shevchenko Mangyshlaxkoi oblasti; Jury N. Belov, 5 Mikroraion, 4, kv. 16, Shevchenko Mangyshlaxkoi oblasti; Valentin P. Saveliev, 4 Mikroraion, 9, kv. 20, Shevchenko Mangyshlaxkoi oblasti; Boris G. Yazikov, 4 Mikroraion, 9, kv. 89, Shevchenko Mangyshlaxkoi oblasti, all of U.S.S.R.

[21] Appl. No.: 967,259

[22] Filed: Dec. 5, 1978

[51] Int. Cl.² .................... B65G 47/04; B05C 3/10
[52] U.S. Cl. .................... 118/58; 118/300; 118/425; 118/DIG. 12; 427/376.5; 427/239; 414/745
[58] Field of Search ............ 118/425, 423, DIG. 10, 118/DIG. 11, DIG. 12, 300; 198/342, 477, 678; 427/239; 414/745, 748

[56] References Cited

U.S. PATENT DOCUMENTS

| 1,919,136 | 7/1933 | Smith | 118/DIG. 10 |
| 2,010,820 | 8/1935 | Lavson | 414/745 |
| 2,066,628 | 1/1937 | Larson et al. | 198/342 |
| 4,068,621 | 1/1978 | Podkletnov | 118/620 |

FOREIGN PATENT DOCUMENTS 2503232  7/1976  Fed. Rep. of Germany ... 118/DIG. 10

Primary Examiner—Ralph S. Kendall
Attorney, Agent, or Firm—Haseltine, Lake & Waters

[57] ABSTRACT

The present invention relates to apparatus for the continuous enamelling of tubes. The apparatus disclosed incorporates an upender which is installed with provision for displacement along guides so as to transfer pipes from a horizontal position into a vertical one. These guides are arranged in vertical parallel planes, at least one guide in each plane, and each of the guides consists of several portions: a horizontal portion, an inclined one, and a portion running vertically so as to transfer the tubes to a trolley located on an annular splitable monorail which is made up of immovable sections and movable ones which displace in the vertical plane integrally with the tube during the process of enamelling. The apparatus also incorporates a means of applying enamelling slip and a means of heating designed to dry and fuse the slip. The apparatus disclosed displays a high capacity and allows to apply the slip to tubes of various lengths and diameters.

3 Claims, 9 Drawing Figures

APPARATUS FOR CONTINUOUS ENAMELLING OF TUBES

FIELD OF THE INVENTION

The present invention relates to the field of enamelling and more specifically, to apparatus for the continuous enamelling of tubes.

BACKGROUND OF THE INVENTION

Practiced at present in the world is the well-known technique of enamelling in kilns which is being constantly improved due to the development of new modern equipment. Yet, the use of firing kilns is a big obstacle in the way of developing the art of enamelling on an industrial basis which contracts the scope of employing vitreous enamelling as a means of protecting metal articles in various branches of the industry. The point is that firing kilns fail to offer the opportunity of observing the process of fusing the enamelling slip and controlling said process with the result that the finely-ground slip is exposed to excessively high destructive temperatures. Moreover, the use of firing kilns requires additional self-contained equipment to cope with the application of enamelling slips, drying of coating, straightening and cooling of the tubes which occupies extra floor area.

Modern firing kilns are provided with powerful telescopic hoists, big mechanical, hydraulic and electrical facilities which serve to maintain high process temperatures in the kiln. This invites operating difficulties and renders the apparatus a sophisticated piece of machinery. The enamel applied to tubing must meet high strength requirements and display a uniform thickness everywhere. But in a firing kiln tubes are subject to bending and this defect impairs the quility of the metal coating applied. To eliminate bends, use is made of straightening machines and this renders the enamelling plant as a whole even a more complicated machine.

The disadvantages mentioned above can be eliminated by a recourse to the induction heating process of tube enamelling which enables the continuous technique of applying an enamel coating either to the inside or outside surface of the tubes or to both surfaces simultaneously.

Under this method, all the operations of applying the enamelling slip, drying, fusing and cooling are carried out successively and simultaneously. The capacity of the induction enamelling process is 5 to 8 times that of the kiln process, and there is the possibility of eliminating local defects without stripping the entire coating when the induction process is employed. In the case of the kiln process, defects can be rectified by re-enamelling of the entire tube surface starting with the stripping of the enamel from the metal surface and finishing with the multiple cycles of slip application, drying and fusing the coating or with the patching of the spoiled placed by fillings in platinum or gold.

There is known in the art an apparatus for the induction process of tube enamelling (cf., for example, Bundesrepublic Deutchland Patentamt No. 2,503,232) comprising an upender with grippers which serves to lift the tubes from a feeding conveyor and transfer them from the horizontal position into a vertical one, a means of applying enamelling slip to at least one side of each tube leaving the upender, a heating means designed to dry and fuse the enamelling slip and a means of hauling the tubes through all stages of the process in succession.

Employed as the means of hauling there are two rotors installed vertically next to each other and provided with grippers for holding the tubes in an upright position during the hauling and processing, one of the rotors catering for the loading and unloading of the tubes and the other displacing the tubes from work station to work station. For transferring the tubes from one rotor to another, use is made of a transfer mechanism. Running contiguously with the loading/unloading rotor is a conveyor for the horizontal conveying of the tubes which has a built-in upender placing the tubes into the vertical position when they are transferred to the loading/unloading rotor and returning them back into the horizontal position when the tubes are removed from this rotor. Each of the tubes is provided with a removable cap applied to one of its ends by means of which the tube is fixed to the loading/unloading rotor and to a carriage of the working rotor displacing along vertical guides.

In the known apparatus, difficulties are encountered during the operations of applying the enamelling slip in two layers, the prime coat and the top coat, at two work stations as well as during the drying and fusing of the slip due to the fact that the vertical position of the tubes is disturbed in the course of their displacement integrally with the rotors and along the vertical guides from station to station. Furthermore, any stopping of the rotors causes the tubes to swing with the result that their centering in the zones of applying, drying and fusing the slip is also disturbed. This results in defective enamel coating, reduced capacity of the apparatus and impaired safety of the personnel. The presence of two work station for the application of the enamelling slips complicates the construction of the apparatus and extends the way travelled by each tube in the course of enamelling.

The use of two vertical rotors installed next to each other also complicates the construction of the apparatus, calls for the necessity of transferring the tubes from one rotor to the other whereas the fact that the guides with the carriages are located on the working rotor adds to the weight of the rotating parts and extends the way the tubes are bound to cover in the course of treatment. This all impairs the operational reliability of the apparatus as a whole let alone such obvious thing that the conveyor and upender of the known design are capable of transferring tubes of only a certain length and diameter from the horizontal position into the vertical one.

Fork-shaped grippers provided on the rotors fail to cater for the enamelling of tubes of various diameter and they also cannot assure a reliable functioning of the upender in removing the tubes and hauling same by the rotors and along the guides in carriages with the result that the safety of the attending personnel can be endangered.

SUMMARY OF THE INVENTION

It is an object of the present invention to provide an apparatus for the continuous enamelling of tubes which is capable of applying enamel to both sides of tubes of any diameter and length.

An important object of the invention is to enhance the operational reliability of the apparatus.

Another object of the invention is to increase the capacity of the apparatus while retaining the requisite quality of the coating.

A further object of the present invention is to simplify the construction of the apparatus and to provide for convenient operation.

Said and other object are attained by the fact that in an apparatus for the continuous enamelling of tubes comprising an upender with grippers serving to remove tubes from a conveyor and to transfer them from a horizontal position into a vertical one, a means of applying enamelling slip to at least one side of every tube leaving the upender, a means of heating designed to dry and fuse the enamelling slip, and a means of hauling the tubes through the stages of the process, the upender is installed, in accordance with the invention, with provision for travelling along guides arranged in vertical parallel planes—at least one guide in each plane—so that each of the guides consists of a first portion running essentially horizontally, of a second portion contiguous with the first one and extending at an angle to the horizontal and of a third portion disposed essentially vertically for the transfer of the tubes from the upender to a trolley located on the means of hauling the tubes which is an annular splitable monorail made up of immovable sections and movable ones displacing integrally with the tube in the vertical plane during the process of enamelling.

It is also possible that arranged in every plane are two guides each whereof is provided with said portions and both guides are so disposed relative to each other that the horizontal portion is a common one for the two of them and the vertical portions run parallel to each other.

The monorail is given the shape of a splitable ring with alternating sections and disposed within the zone of the displacement of the movable sections of the monorail are guides moving along which are the movable sections of the monorail, the guides being fitted to uprights.

An advantage offered by the invention consists before all in that the apparatus is of a streamlined construction incorporating mechanisms which prevent the tubes from swinging in the vertical position. Another point is that the tubes are centered during their up-and-down displacement in the zones of applying, drying and fusing the enamelling slip so that the process of applying the enamelling slip is not only substantially simplified but also yields a better coating due to the possibility of maintaining optimum conditions of drying, fusing and cooling the enamel.

Another advantage obtained by virtue of the invention is that the means of hauling are given the form of the disclosed upender with guides enabling the handling of tubes so as to enamel them at both sides irrespectively of the length and diameter which may vary.

A further advantage is that the annular splitable monorail consisting of immovable and movable sections displacing along the guides is of a compact layout. This reduces the floor area requirements for the apparatus, cuts metal requirements for the manufacturer of the apparatus and allows to employ various rates of enamelling while retaining the specified quality of the coating.

Summing up, the apparatus has a high capacity, low weight of the rotating components, a comparatively simple means of hauling the tubes which is also a more advanced one at the same time, and a low total weight. This all is conducive to lowering the percentage of rejected enamelled tubes and reducing the first cost of tubes.

BRIEF DESCRIPTION OF THE DRAWINGS

The essence of the present invention will be best understood from the following preferred embodiments described by way of example when the description is being read in conjunction with the accompanying drawings in which.

DETAILED DESCRIPTION OF THE INVENTION

Figure 1:
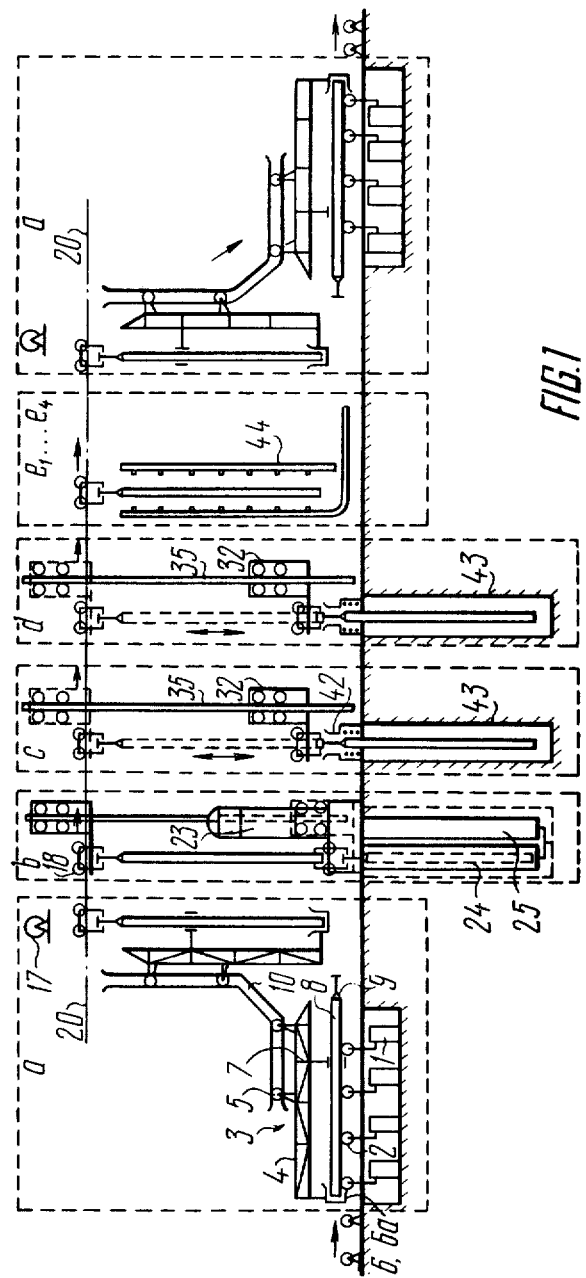
FIG. 1 is an unfolded view of the flow chart of the process of hauling and enamelling tubes.

To cope with the process, the apparatus is provided with the following work stations shown in FIG. 1:

a, transferring a tube from the horizontal into vertical position;

b, applying enamelling slip to the tube;

c, drying of the enamelling slip;

$e_1$ through $e_4$, cooling of the coating and that of the metal of the tube.

Entering the work station "a" of the apparatus is a roller conveyor I (FIG. 1) with retractable rollers and an upender 3 consisting of a boom 4 with rollers 5 fitted to which are grippers adjustable for tube diameter—footstep gripper 6 with built-in jaws 6a at the bottom and a gripper 7. Both grippers 6 and 7 can be actuated by any means, say air-operated cylinders. The grippers are applied to the tube 8 with a slight clearance which prevents the damage of the enamel. The tube 8 is also provided with a hold-down cap 9.

The boom 4 of the upender 3 is capable of travelling along curvilinear guides running in vertical parallel planes, either one guide in each plane or two guides in each plane. In the former case, the guide 10 (FIG. 2) consists of three portions, a portion II arranged horizontally, a portion 12 contiguous with the portion II and extending essentially at an angle to the horizontal and a portion 13 which is contiguous with the portion 12 and runs essentially vertically. In the latter case, the guide 10 (FIG. 3) consists of said portions 11, 12, 13 and the guide 14 is made up of a portion 15 extending at an angle to the horizontal and a portion 16 arranged essentially vertically and placed contiguously with the portion 15. Both guides 10 and 14 are disposed relative to each other so that the horizontal portion 11 is a common for both of them and the vertical portions 13 and 15 extend in parallel to each other.

Built-into the upender 3 is a winch 17 which serves the purpose of transferring the tube 8 from the horizontal position into the vertical one and vice versa.

Figure 5:
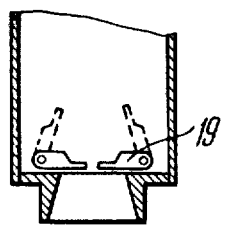
FIG. 5 is a close view of sub-assembly A in FIG. 2.
Figure 6:
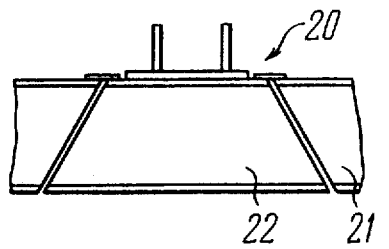
FIG. 6 is a view in the direction of arrow B in FIG. 4.
Figure 7:
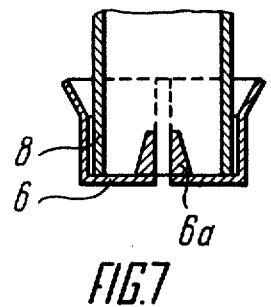
FIG. 7 is a close view of sub-assembly C in FIG. 2.

Available at the work station "b" of the apparatus (FIG. 1) is a trolley 18 fitted with self-interlocking grippers 19 (FIG. 5) of the pivotal type which fix the tube 8 in the vertical position through the intermediary of the hold-down cap 9. The trolley 18 is placed on the means of hauling which is an annular splitable monorail 20 (FIG. 2) made up of immovable sections 21 (FIG. 6) and movable sections 22. Also available at the work station "b" (FIG. 1) is a means 23 of applying the enamelling slip with two containers 24 and 25 contained wherein is the prime coat and top coat, respectively.

Figure 4:
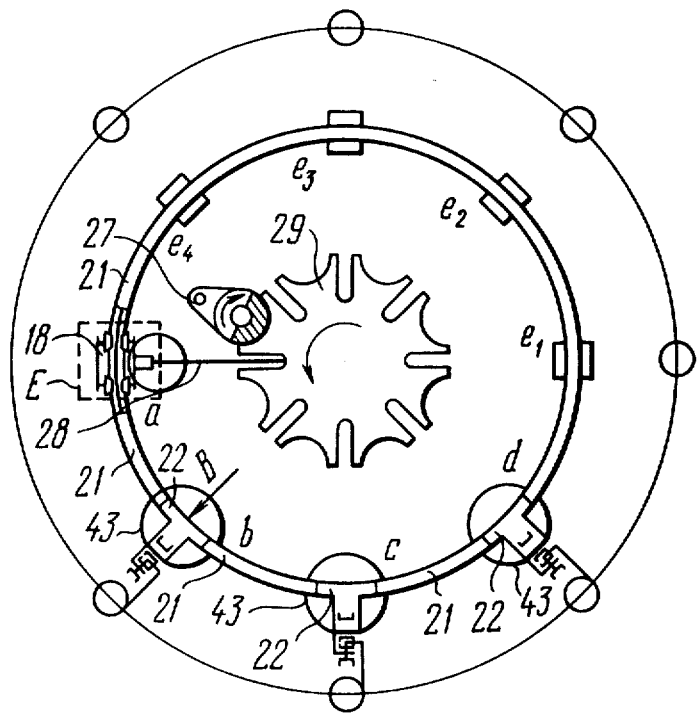
FIG. 4 is a section on line IV—IV of FIG. 2 giving a plan view of the annular splitable monorail with carriages and their drive mechanism.
Figure 8:
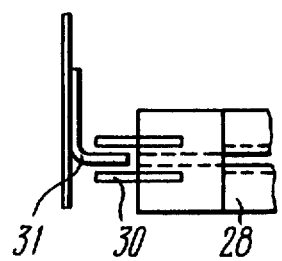
FIG. 8 is a close view of sub-assembly E in FIG. 4.

Serving the purpose of hauling the trolley 18 with the tube 8 around the monorail 20 is a mechanism consisting of a drive motor 26, an actuating crank 27 (FIG. 4), an arm 28 and a star wheel 29 linked up with the arm 28. The end of the arm 28 is provided with a fork 30 (FIG. 8) whose slot is arranged vertically, and the trolley 18 is held in engagement with the fork 30 by means of a pin 31.

Figure 2:
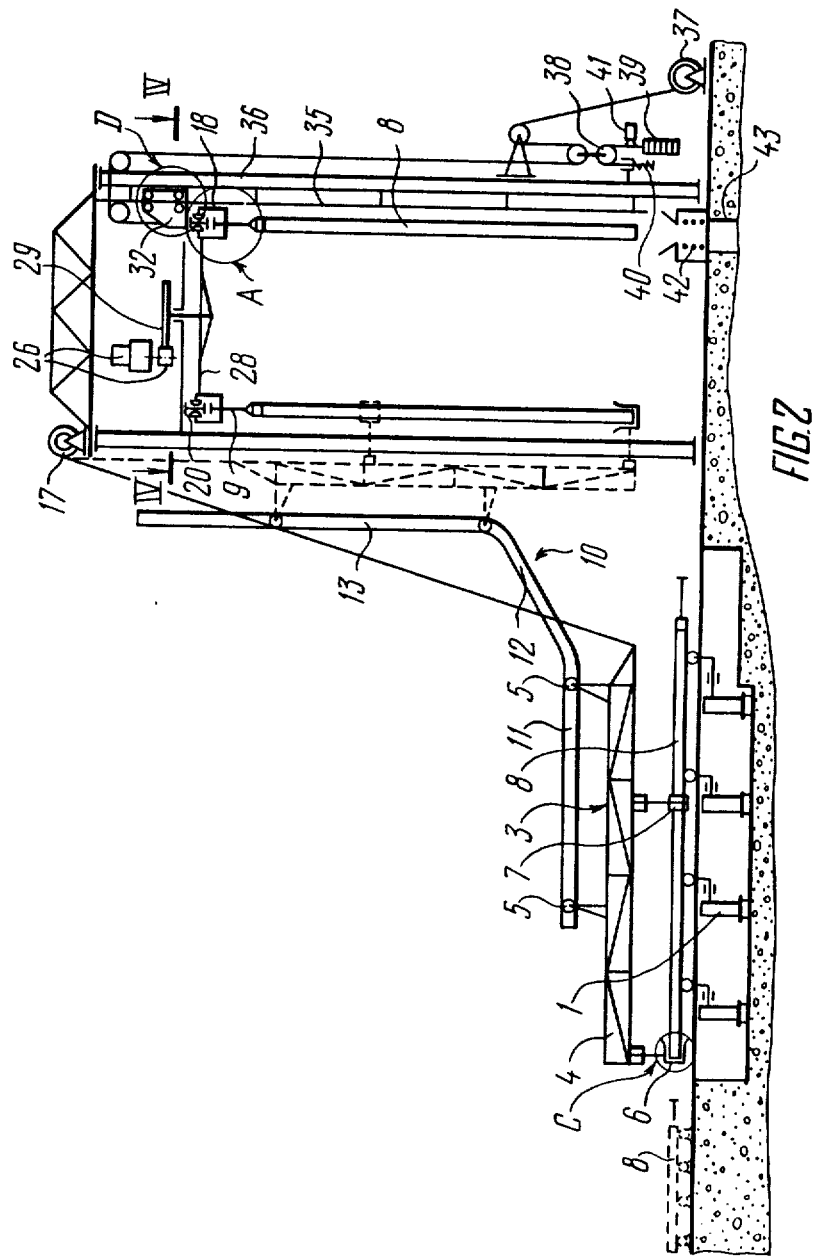
FIG. 2 is a general view of the disclosed apparatus for the continuous enamelling of tubes in which the boom of upender is shown in dotted lines in its topmost position during the feeding of the tubes to, and removing them from, the apparatus.
Figure 3:
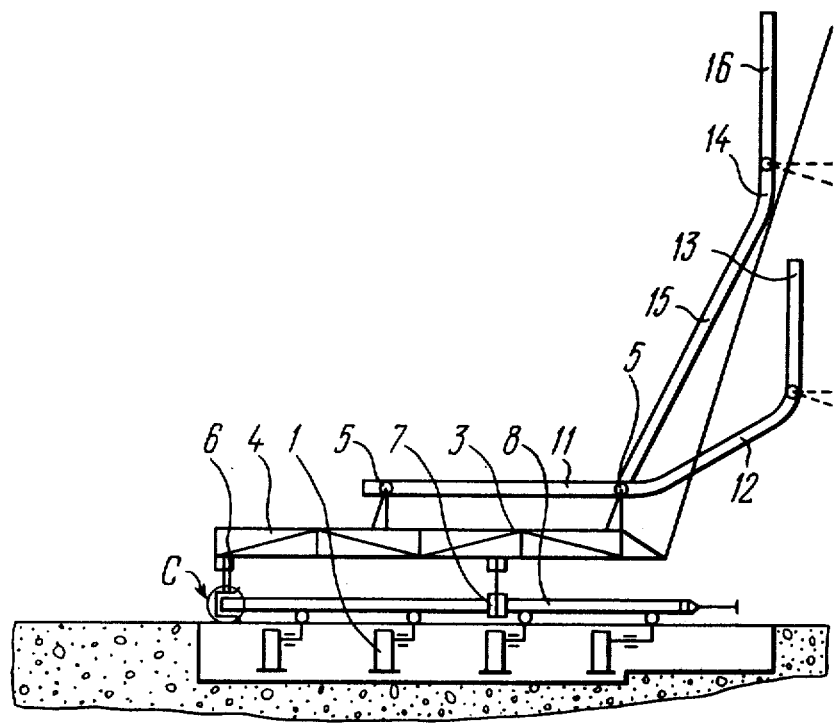
FIG. 3 is a view of the upender with two guides located in each of the vertical planes.
Figure 9:
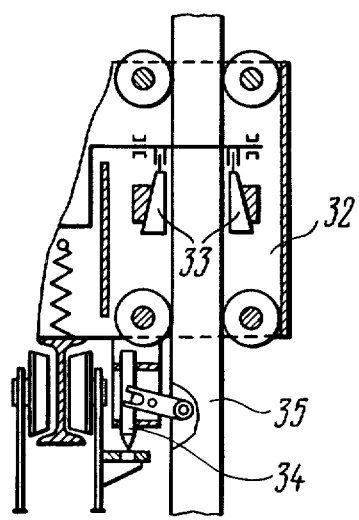
FIG. 9 is a close view of sub-assembly D in FIG. 2.

Arranged at the work station "c" (FIG. 1) is a carriage 32 (FIG. 9) attached whereto is a movable section 22 of the monorail. The carriage is provided with automatic safety catches 33, commonly wedge-shaped ones intended to function in the event of rope breakage, and an arrester 34 of the copying type which serves to fix the trolley 18 with respect to the movable section 22 of the monorail. The carriage 32 (FIG. 2) can be displaced vertically by a drive 37 (FIG. 2) along guides 35 (FIG. 9) fitted to uprights 36 (FIG. 2).

To provide for a shockless and reliable registering of the movable monorail sections 22 with the immovable sections 21, the rope of the drive 37 is reeved through a shock absorber consisting of a movable pulley block 38, a counterweight 39, a spring 40 and a limit switch 41.

Serving the purpose of drying the tube 8 applied whereto has been the enamelling slip is a special means consisting of an induction heater 42 and a shaft 43 wherein the tube 8 can be moved up and down.

The work station "d" is arranged on the same lines as the work station "c".

Arranged at the work stations "$e_1$" through "$e_4$" are means 44 for the forced draught cooling of the enamelled tubes 8.

Operation

The apparatus disclosed operates in the following way. A tube 8, shotblasted or cleaned in some other way in advance, is loaded onto the roller conveyor 1 with the retractable rollers 2 and is transferred to the upender 3 by the boom 3 with the grippers 6 and 7. As the rollers 2 retract downwards, the upender 3 places the tube 8 into the vertical position with the aid of its winch 17, displacing on the rollers 5 along the guides 10 over a distance enabling the hold-down cap 9 to fit into the pivotal self-interlocking grippers 19 of the trolley 18 in a reliable way. The winch 17 is stopped with the aid of the corresponding limit switches so that the tube 8 lifted to the annular monorail 20 can be of various length. Since a clearance does exist between the tube 8 and the grippers 6 and 7, the boom 4 is free to lower to a certain height with the grippers being in the closed position.

Next, a signal fed causes to open the footstep gripper 6 followed by the gripper 7. If, however, the gripper 19 has failed to clamp the tube, the footstep gripper will not release its hold due to the presence of the jaws 6a entering the bore of the tube 8. The trolley 18 with the tube 8 suspended therefrom is set into motion by the arm 28 being engaged therewith by the fork 30 and pin 31. The arm 28 is actuated by the mechanism comprised of the drive motor 26, the crank 27 and the star wheel 29 which is linked up with the crank; the arm 28 rotates at intervals depending on the operations performed with the tube which all are coped with at the work stations a, b, c, d, $e_1$–$e_4$ at the same time and independently from each other.

When the trolley 18 is brought to a halt at the work station "b", it is positioned on a movable section 22 of the monorail 20. The enamelling slip can be applied to the tube 8 by spraying, using a device 23, or by dipping into the containers 24 and 25. When dipping is employed, the tube 8 is displaced vertically by means of the drive 37 which lowers the carriage 32 along the guides 35 integrally with the movable section 22 linked therewith as well as the trolley 18 which is fixed to the movable section 22 of the monorail 20 by the arrester 34 of the copying type. In the event of rope breakage, the safety catches 33 the carriage 32 is fitted with prevent the tube 8 from dropping to the bottom. The tube 8 is lowered and risen at a rate specified for the process. The fork 30 is specially designed so as to enable the vertical displacement of the carriage 32 integrally with the trolley 18 resting thereon and the tube 8.

When the tube 8 has risen to its original position, the movable section of the monorail 20 is set level with the immovable sections 21 while the pin 31 of the trolley 18 engages the fork 30.

A shockless and accurate registering of the movable section 22 with its immovable counterpart 21 is achieved due to the fact that the counterweight 39 rises and, acting on the limit switch 41, cuts out the drive 37.

While the operation of applying the enamelling slip is carried out at the work station "b", the drying and fusing take place at the work stations "c" and "d", respectively, employing any known technique which can be a displacement of the tube 8 vertically through the heater 42 in the same way as at the work station "b". This enables the enamelling to be carried out as a continuous process.

For the cooling of the tube 8 at the work stations $e_1$ through $e_4$, use is made either of the forced draught cooling means 44 or the recourse is to natural cooling. The cooled down tube 8 is removed from the apparatus by the upender 3, proceeding in the reverse order as this was described above, or the enamelling cycle is repeated if a multi-layer coat is applied. In removing the tube 8 from the trolley 18, the pivotal grippers 19 are forced apart by any means of actuating.

What is claimed is:

1. An apparatus for the continuous enamelling of tubes comprising: a conveyor for feeding the tubes, an upender in the form of a boom with grippers which serve to receive the tubes from said conveyor and transfer them from the horizontal position into a vertical one, and is installed with provision for displacement; guides placed whereby said boom of said upender are in vertical parallel planes, having at least one guide in every plane and consisting each of more than one portion; a first of said portions running essentially horizontally; a second portion contiguous with the first one and extending at an angle to the horizontal, a third portion running essentially vertically so that the tube is transferred from the horizontal position into the vertical one, a trolley for receiving the vertically arranged tube which rests on a monorail made up of immovable and movable sections, said movable sections of said monorail, displacing vertically and integral with the tube in carrying out the process of enamelling, means for applying the enamelling slip to at least one side of the tube, and means for heating to dry and fuse the enamelling slip.

2. An apparatus as claimed in claim 1, wherein: two guides are in every plane, each whereof is provided with said portions and both guides are so disposed relative to each other, that the horizontal portion is common for the two of them and the vertical portions run parallel to each other.

3. An apparatus as claimed in claim 1, wherein: said monorail is in the shape of a splitable ring made up of alternating sections and disposed within the zones of the displacement of the movable sections of the monorail are guides for moving which are the movable sections of the monorail, and the guides being fitted to uprights.

* * * * *